United States Patent Office 3,017,753
Patented Jan. 23, 1962

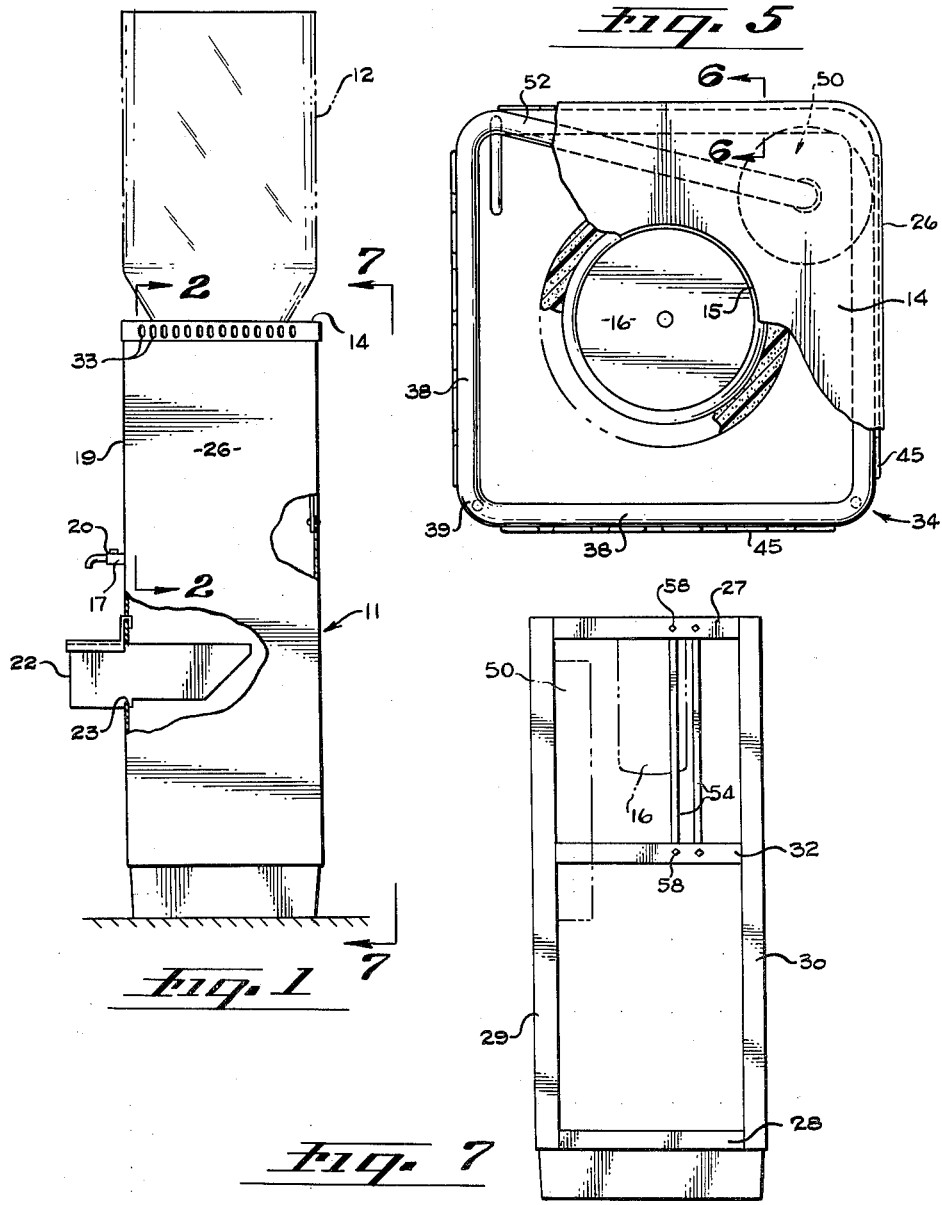

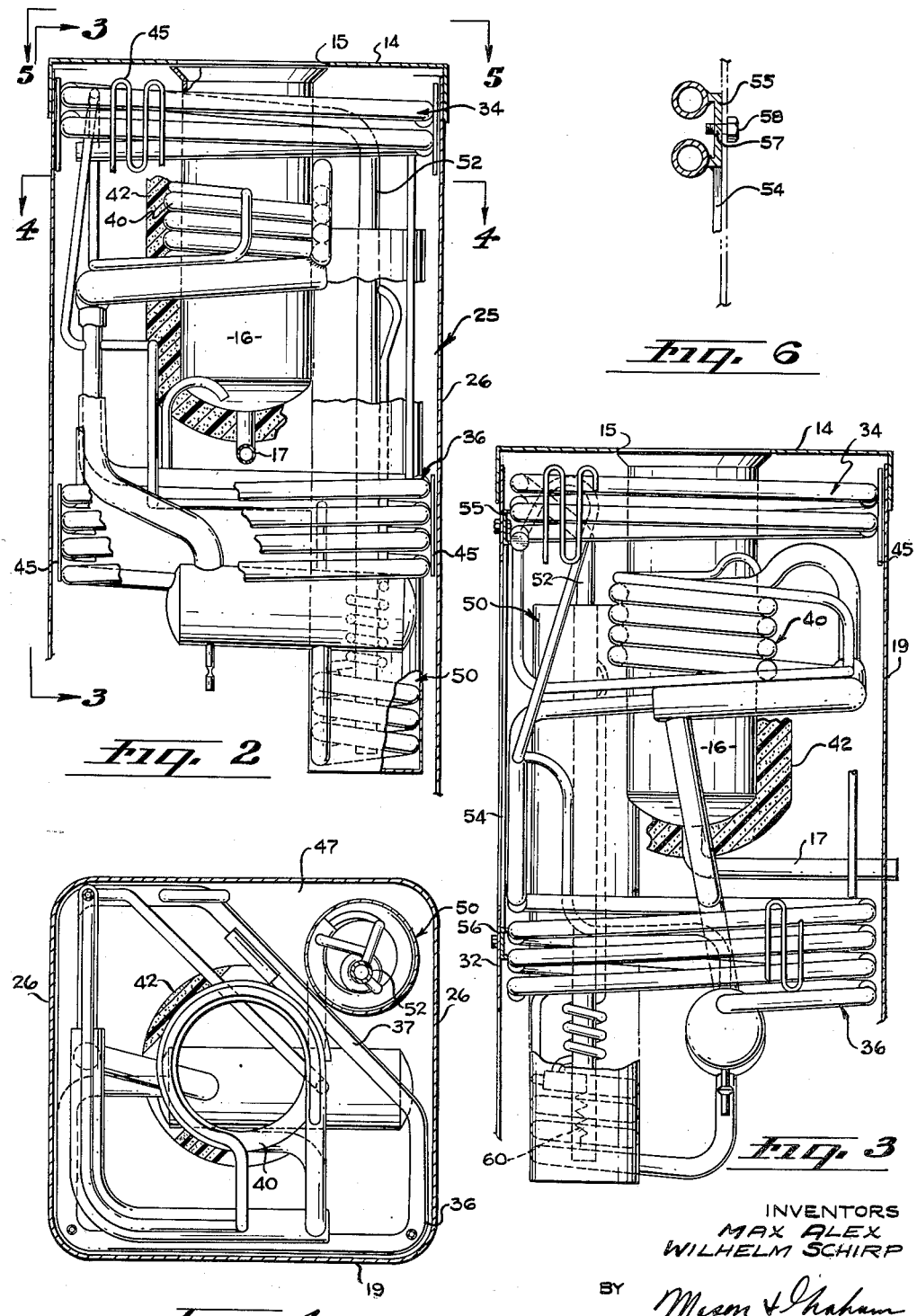

3,017,753
WATER COOLER
Wilhelm Schirp, Gummersbach, Germany, and Max Alex, Pasadena, Calif., assignors to Alaska-Werk, Bergneustadt, Rhineland, Germany
Filed June 30, 1959, Ser. No. 824,083
3 Claims. (Cl. 62—395)

This invention has to do generally with refrigeration, and more particularly with the refrigeration or cooling of liquids to be dispensed.

An object of the invention is to provide an improved and novel arrangement of the components of a refrigeration system particularly suitable for incorporation in a water cooler or beverage dispenser. In this connection it is an object to provide such an arrangement for a continuous-working absorption-type refrigeration system, of which one employing ammonia, water, and hydrogen is an example. In such a system water containing ammonia is heated in a generator to vaporize the ammonia. The vapor passes to a separator for removal of water vapor after which the ammonia gas is passed through a condenser, and then, in liquid form, conducted to the evaporator where it absorbs heat and is again vaporized. From the evaporator the gas or vapor is conducted to an absorber wherein the ammonia is absorbed by water. Hydrogen gas from the absorber is introduced into the evaporator to act as a vehicle for the removal of the ammonia vapor. From the absorber the water and ammonia return to the generator to complete the cycle.

It is a further object of the invention to provide a novel, efficient and compact arrangement of the above-mentioned parts of such a refrigeration system, and particularly a novel form and arrangement of the condenser and absorber.

In conventional refrigeration systems for use in water coolers, household refrigerators and the like, the absorber and condenser are usually located in back of the cabinet or beneath it. In either case the space available for these parts is limited and this in turn reduces the efficiency of the system. It is therefore another object to provide a novel arrangement wherein the condenser and absorber are in coil form and are disposed within the casing and encircling the central interior area within the casing wherein the evaporator of the system is located in association with the container for the liquid or other substance to be cooled.

A further object is to provide a novel arrangement of the components of a refrigeration system wherein the condenser and absorber coils are disposed in vertically spaced relation with the generator extending vertically past the absorber and with the evaporator centrally located with respect to the axis of the coils.

Another object is to provide a refrigeration means of the type indicated which can be readily fabricated and easily installed in the casing.

These and other objects will be apparent from the drawings and the following description. Referring to the drawings:

FIG. 1 is a side elevational view, partly broken away, showing a water cooler embodying the invention;

FIG. 2 is a central fragmentary sectional view through the upper portion of the device of FIG. 1, on line 2—2 thereof, but on a larger scale;

FIG. 3 is a sectional view on line 3—3 of FIG. 2, with the casing broken away;

FIG. 4 is a sectional plan view on line 4—4 of FIG. 2;

FIG. 5 is a plan view on line 5—5 of FIG. 2, partly broken away;

FIG. 6 is a detail sectional view of a portion of the mounting bracket; and

FIG. 7 is a rear elevational view of the device of FIG. 1.

More particularly describing the invention, 11 generally designates a water cooler unit of the type adapted to be supplied with water from a bottle 12 shown inverted above the cooler and supported upon the top wall 14 of the casing, the top wall having an opening 15 to receive the neck of the bottle which projects into the reservoir or container 16 for the liquid to be cooled. Container 16 has an outlet pipe 17 which projects through the front wall 19 of the casing, being provided with a suitable faucet 20. Beneath the faucet is a receptacle 22 of any suitable design for catching the drip from the faucet, the receptacle being removably mounted in an opening 23 in the front wall.

The refrigeration means, generally designated by numeral 25, is adapted to be mounted in the upper part of the casing above the drip catcher receptacle 22. The casing itself is provided with side walls 26 which extend normally to the front wall 19. The casing is open at the rear, being provided with upper and lower cross members 27 and 28, respectively, connecting upright corner posts 29 and 30 and with the intermediate cross member 32. Although the casing as shown is rectangular or square in cross section, this is not essential, since other cross sectional shapes can be used, in which case the refrigeration system means 25 is shaped to correspond thereto.

The casing walls are provided with suitable ventilation apertures 33 as shown in FIG. 1.

The refrigeration unit 25 embodies a pair of vertically spaced coils designated 34 and 36, the upper coil 34 being utilized as a condenser and the lower coil 36 as an absorber or as a part of the absorption unit. The components of the system are designed for use in a refrigeration system of the type previously described utilizing ammonia, water and hydrogen, as previously explained. The two coils 34 and 36 are formed and dimensioned to lie closely adjacent the walls of the casing, except that coil 36 is flattened opposite one corner of the casing to provide diagonal tube sections 37. Thus the coil 34 is made up of several convolutions or turns of tubing wherein the individual turns are substantially rectangular, being formed of straight sections 38 and short connecting radius or curved sections 39 (FIG. 5). One end of the coil 34 connects with the evaporator, designated 40, and shown as a helical coil having close convolutions encircling the container 16. If desired, the container may be of metal and the coil 40 brazed or welded thereto to facilitate conduction of heat. Both the container and evaporator coil are encased in a thick layer 42 of any suitable material having heat insulation properties.

The coils 34 and 36 are preferably provided on their peripheries with a convolute grid 45 which is brazed or welded to the coils. The grid serves both to stiffen the coil and to increase heat dissipation, and in this connection the grid is designed to closely fit within the casing and preferably in engagement with the inner surfaces of the side and front walls of the casing. To improve the heat transfer and enable the casing itself to radiate some of the heat, if desired the grid may be directly attached to the casing as by being welded or brazed thereto.

The coil 36 with its flattened side provides space 47 within the casing for a generally upright combined generator, gas pump and liquid heat exchanger 50. This unit extends vertically from a position below the coil 36 to a position considerably above the coil and alongside but spaced from the container 16 and evaporator coil 40. The upper end of the generator connects with the condenser through tube 52. Either gas or electricity can be used as a source of heat for the generator, and by way of illustration, an electrical resistance 60 has been shown diagrammatically in FIG. 3.

The two coils 34 and 36 are secured together in vertically spaced relation and thereby structurally unitized by a bracket which comprises a pair of upright straps designated 54 which are welded or otherwise secured to two channel-shaped cross members, designated 55 and 56. The latter are brazed or welded to two of the turns of the coils, respectively, as best shown in FIG. 6. The cross members can be provided with a plurality of holes 57 for the reception of screws 58 which can be used to anchor the unit as a whole within the casing, the bracket being attached to the cross members 27 and 32 of the casing.

It will be understood that the various tubing and piping shown, but not described in detail, is used to operatively connect the various units or parts of the refrigeration system, particularly one of the type hereinbefore referred to, and it is believed unnecessary to describe each section of tubing or to provide a flow diagram for the system, since such connections and systems are well known in the art.

Also, while the evaporator has been shown in the form of a coil surrounding the container 16, it could well take the form of a cascade unit within the container. Additionally the container might be dispensed with where there is a continuous supply of the liquid to be cooled and a coil containing the liquid to be cooled could be disposed between or adjacent the evaporator coil. Also, the particular arrangement of the refrigeration components might be used for cooling substances other than liquids, in which case a closable but otherwise accessible chamber could be used in place of the open-topped container 16 shown, or an an additional unit.

Although we have illustrated and described a preferred form of our invention, we contemplate that various changes and modifications can be made therein without departing from the invention, the scope of which is indicated by the following claims.

We claim:

1. In a water cooler or the like, an upright metal outer casing, a water container mounted centrally of the casing and spaced inwardly of the sides thereof, a unitary refrigeration system within the casing, said system including an evaporator in the form of a tubular coil around said container, including a condenser in the form of a coil of tubing formed about a vertical axis substantially coincident with the central vertical axis of the casing, the individual turns of said coil closely following the casing walls and being adjacent thereto, including an absorber in the form of a coil of tubing formed about an axis substantially coincident with the axis of said condenser, said absorber coil being flattened on one side leaving a substantial space between it and the casing, the remainder of said absorber coil closely following the casing walls and being adjacent thereto, and including an upright generator within the casing extending upwardly past the flatened side of said absorber coil, said condenser and absorber coils being vertically spaced, a bracket rigidly attached to said condenser coil and to said absorber coil, and means attaching said bracket to said casing whereby to mount said refrigeration system in said casing.

2. In a device for cooling a substance by refrigeration, a metal casing of generally rectangular cross-sectional shape forming the exterior walls of the device and including a front panel and two parallel side panels normal thereto, a container for the substance to be cooled disposed within the casing substantially on the vertical central axis thereof and spaced inwardly of the casing panels, and an absorption-type refrigeration system within the casing including an evaporator associated with the container, a condenser tubing coil adapted to be cooled by the ambient atmosphere having its convolutions closely adjacent the panels of the casing, an absorber tubing coil adapted to be cooled by the ambient atmosphere spaced below said condenser coil and having a major portion of each of its convolutions closely adjacent the panels of the casing, said absorber tubing coil having a flattened side opposite one corner of the casing leaving a substantial space therebetween, and an upright generator in said space, said condenser and absorber coils being disposed about the central vertical axis of the casing.

3. The device set forth in claim 2 in which a bracket is rigidly secured to said condenser and absorber coils and in which said bracket is detachably secured to said casing.

References Cited in the file of this patent
UNITED STATES PATENTS

| | | |
|---|---|---|
| 1,678,277 | Von Platen | July 24, 1928 |
| 1,822,250 | Taylor | Sept. 8, 1931 |
| 2,509,294 | Fruen | May 30, 1950 |
| 2,850,883 | Philipp | Sept. 9, 1958 |